United States Patent
Shimono et al.

(10) Patent No.: US 11,396,141 B2
(45) Date of Patent: Jul. 26, 2022

(54) REPAIR PATCH, METHOD FOR MOLDING REPAIR PATCH, AND METHOD FOR REPAIRING COMPOSITE MATERIAL

(71) Applicant: MITSUBISHI HEAVY INDUSTRIES, LTD., Tokyo (JP)

(72) Inventors: Kodai Shimono, Tokyo (JP); Koichi Hasegawa, Tokyo (JP); Takuma Hirai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/275,081

(22) PCT Filed: Jul. 23, 2019

(86) PCT No.: PCT/JP2019/028830
§ 371 (c)(1),
(2) Date: Mar. 10, 2021

(87) PCT Pub. No.: WO2020/054220
PCT Pub. Date: Mar. 19, 2020

(65) Prior Publication Data
US 2021/0252805 A1      Aug. 19, 2021

(30) Foreign Application Priority Data

Sep. 11, 2018   (JP) .............................. JP2018-169850

(51) Int. Cl.
*B64F 5/40*         (2017.01)
*B29C 70/30*        (2006.01)
(Continued)

(52) U.S. Cl.
CPC ............ *B29C 70/30* (2013.01); *B29C 70/542* (2013.01); *B29C 73/14* (2013.01); *B29C 73/10* (2013.01);
(Continued)

(58) Field of Classification Search
CPC ........... B32B 2556/00; B32B 2260/023; B64F 50/40; Y10T 428/14; Y10T 428/1471; Y10T 428/1478
(Continued)

(56) References Cited

U.S. PATENT DOCUMENTS 5,972,141 A    10/1999  Ellyin
9,365,282 B2    6/2016  Shigetomi et al.
(Continued)

FOREIGN PATENT DOCUMENTS

JP       2012-519615       8/2012
JP       2013-513499       4/2013
(Continued)

OTHER PUBLICATIONS

International Search Report dated Oct. 15, 2019 in International (PCT) Application No. PCT/JP2019/028830.
(Continued)

*Primary Examiner* — Scott W Dodds
(74) *Attorney, Agent, or Firm* — Wenderoth, Lind & Ponack, L.L.P.

(57) ABSTRACT

A repair patch is for a composite material to repair a part to be repaired which is a repair target of the composite material. The patch includes a patch main body that is formed by laminating a plurality of fiber reinforced preforms in a thickness direction, and has a bonding surface to be bonded to the part to be repaired; and a removal layer that is provided on the bonding surface to be peelable off from the patch main body. The bonding surface includes an inclined surface that is inclined with respect to the thickness direction of the patch main body. The removal layer includes a processed portion that causes the removal layer to have a shape complementary to a shape of the inclined surface of the patch main body.

8 Claims, 4 Drawing Sheets

(51) Int. Cl.
*B29C 73/14* (2006.01)
*B29C 70/54* (2006.01)
*B29C 73/10* (2006.01)
*B32B 17/04* (2006.01)

(52) U.S. Cl.
CPC ......... *B32B 17/04* (2013.01); *B32B 2260/023* (2013.01); *B32B 2556/00* (2013.01); *B64F 5/40* (2017.01); *Y10T 428/14* (2015.01)

(58) Field of Classification Search
USPC ...................................... 428/40.1, 41.7, 41.8
See application file for complete search history.

(56) References Cited

U.S. PATENT DOCUMENTS

| | | |
|---|---|---|
| 2010/0227117 A1 | 9/2010 | Dan-Jumbo et al. |
| 2011/0139344 A1 | 6/2011 | Watson et al. |
| 2014/0141190 A1 | 5/2014 | Shigetomi et al. |
| 2014/0322540 A1* | 10/2014 | Ferguson ................ C23C 22/73 428/416 |
| 2017/0212038 A1* | 7/2017 | Watson .................. G01N 21/84 |

FOREIGN PATENT DOCUMENTS

| | | |
|---|---|---|
| JP | 2014-100847 | 6/2014 |
| JP | 6124561 | 4/2017 |

OTHER PUBLICATIONS

International Preliminary Report on Patentability and Written Opinion of The Searching Authority dated Oct. 15, 2019 in International (PCT) Application No. PCT/JP2019/028830, with English-language translation.

* cited by examiner

REPAIR PATCH, METHOD FOR MOLDING REPAIR PATCH, AND METHOD FOR REPAIRING COMPOSITE MATERIAL

TECHNICAL FIELD

The present invention relates to a repair patch for a composite material to repair a part to be repaired which is a repair target of the composite material, a method for molding a repair patch, and a method for repairing a composite material.

BACKGROUND ART

In the related art, as a repair method for repairing a part to be repaired such as a damaged part which is a repair target of a composite material, there is known a method for repairing a composite material, in which a truncated cone-shaped area which is increased in diameter from a back surface side toward a surface side of the composite material is removed, and a repair material is bonded to a recessed portion which is formed by the removal (for example, refer to PTL 1).

CITATION LIST

Patent Literature

[PTL 1] Japanese Patent No. 6124561

SUMMARY OF INVENTION

Technical Problem

Here, as the repair material to be bonded to a counterbore hole such as a recessed portion, for example, there is a repair patch disclosed in PTL 1. The repair patch has a truncated cone shape, and has a bottom surface, a top surface, and an inclined surface. Fiber reinforced preforms having circular shapes of different diameters are concentrically laminated to mold the repair patch having a truncated cone shape.

However, when the fiber reinforced preforms are laminated to form the repair patch, fiber meandering (wrinkle) is generated in an end portion of the fiber reinforced preform of each layer, which is a problem. When the part to be repaired is repaired with such a repair patch, it is difficult to sufficiently recover the strength of the part to be repaired as compared to the strength before damage.

Therefore, an object of the present invention is to provide a repair patch that suppresses the generation of fiber meandering and is molded in an appropriate shape, a method for molding a repair patch, and a method for repairing a composite material.

Solution to Problem

According to the present invention, there is provided a repair patch for a composite material to repair a part to be repaired which is a repair target of the composite material, the patch including: a patch main body that is formed by laminating a plurality of fiber reinforced preforms in a thickness direction, and has a bonding surface to be bonded to the part to be repaired; and a removal layer that is provided on the bonding surface to be peelable off from the patch main body. The bonding surface includes an inclined surface that is inclined with respect to the thickness direction of the patch main body. The removal layer includes a processed portion that causes the removal layer to have a shape complementary to a shape of the inclined surface of the patch main body.

According to the configuration, since end portions of the plurality of fiber reinforced preforms, the end portions forming the inclined surface of the patch main body, can be pressed by the removal layer having a shape complementary to the shape of the inclined surface, fiber meandering can be suppressed from being generated in the end portions of the fiber reinforced preforms. For this reason, the patch main body can be shaped into an appropriate shape. In addition, the removal layer can protect the bonding surface of the patch main body.

In addition, it is preferable that the processed portion is formed of slits that are formed at positions to face end portions of the plurality of fiber reinforced preforms in the thickness direction of the patch main body, the end portions being located in the inclined surface.

According to the configuration, since the slits are formed in the removal layer, the end portions of the fiber reinforced preforms can be appropriately pressed by the removal layer.

In addition, it is preferable that the processed portion is formed of a plurality of through-holes that penetrate through the removal layer at positions to face end portions of the plurality of fiber reinforced preforms in the thickness direction of the patch main body, the end portions being located in the inclined surface.

According to the configuration, since the plurality of through-holes are formed in the removal layer, the end portions of the fiber reinforced preforms can be appropriately pressed by the removal layer.

In addition, it is preferable that the removal layer is a peel ply.

According to the configuration, since the peel ply can be peeled off to activate the bonding surface of the patch main body, the bondability of the bonding surface to the part to be repaired can be enhanced.

According to the present invention, there is provided a method for molding a repair patch for a composite material to repair a part to be repaired which is a repair target of the composite material, the method including: a laminate forming step of laminating a plurality of fiber reinforced preforms in a thickness direction such that a bonding surface to be bonded to the part to be repaired is an upper surface, to form a laminate; a removal layer disposition step of disposing a removal layer, which is peelable off from the laminate, to cover the bonding surface of the laminate; and a molding step of heating the laminate and the removal layer to be integrated to mold the laminate and the removal layer. The bonding surface includes an inclined surface that is inclined with respect to the thickness direction of the laminate. A processed portion is provided in the removal layer to cause the removal layer to have a shape complementary to a shape of the inclined surface of the laminate. In the molding step, the removal layer is deformed according to the shape of the inclined surface of the laminate due to the processed portion.

According to the configuration, since end portions of the plurality of fiber reinforced preforms, the end portions forming the inclined surface of the laminate, can be pressed by the removal layer that is deformed to have a shape complementary to the shape of the inclined surface, fiber meandering can be suppressed from being generated in the end portions of the fiber reinforced preforms. For this reason, the repair patch having an appropriate shape can be molded.

In addition, in the molding step, it is preferable that a covering member which follows the deformation of the removal layer is disposed to cover the removal layer to mold the laminate and the removal layer.

According to the configuration, the removal layer can be appropriately deformed without interruption in the deformation of the removal layer. Incidentally, the covering member may be a bag film having good followability, or may be a film adhesive provided between a bag film and the removal layer, and is not particularly limited.

According to the present invention, there is provided a method for repairing a composite material, which repairs a part to be repaired that is a repair target of the composite material, the method including: preparing the repair patch in advance; a peeling step of peeling the removal layer off from the patch main body; an adhesive agent disposition step of disposing an adhesive agent on a surface to be bonded of the part to be repaired; a patch disposition step of disposing the bonding surface of the patch main body to face the surface to be bonded with the adhesive agent interposed therebetween; and a bonding step of bonding the patch main body to the part to be repaired.

According to the configuration, the removal layer is peeled off from the patch main body to cause the bonding surface of the patch main body to be exposed, the bonding surface being protected, so that the patch main body can be bonded to the part to be repaired. For this reason, while foreign matter is suppressed from adhering to the bonding surface, the patch main body having an appropriate shape can be bonded to the part to be repaired, so that the part to be repaired can be suitably repaired.

DESCRIPTION OF EMBODIMENTS

Hereinafter, embodiments according to the present invention will be described in detail with reference to the drawings. Incidentally, the invention is not limited by the embodiments. In addition, components in the following embodiments include those that can be easily replaced by those skilled in the art, or those that are substantially the same. Furthermore, the components described below can be combined as appropriate, and when there are a plurality of embodiments, the embodiments can be combined.

First Embodiment

A repair patch 10 according to the present embodiment is a repair material used to repair a composite material. A method for repairing a composite material using the repair patch 10 is a method in which a defect part that is formed in a composite material by damage or the like is a repair target, and a part to be repaired which is the repair target is repaired.

Figure 1:
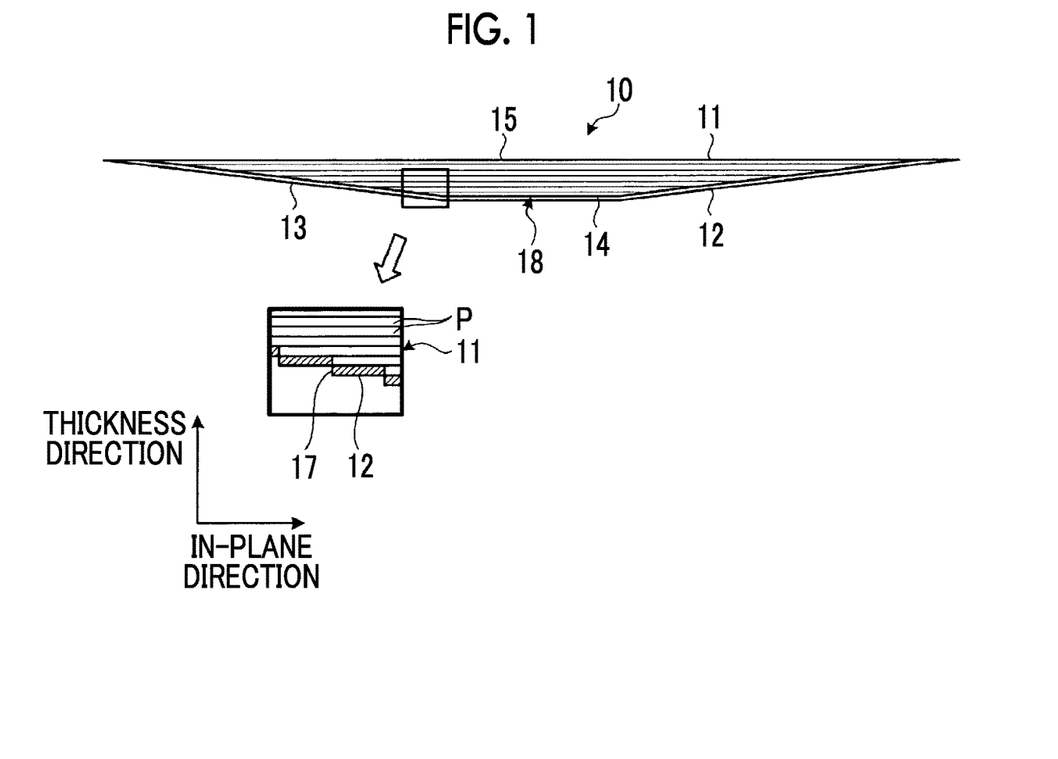
FIG. 1 is a cross-sectional view schematically illustrating one example of a repair patch according to a first embodiment.
Figure 2:
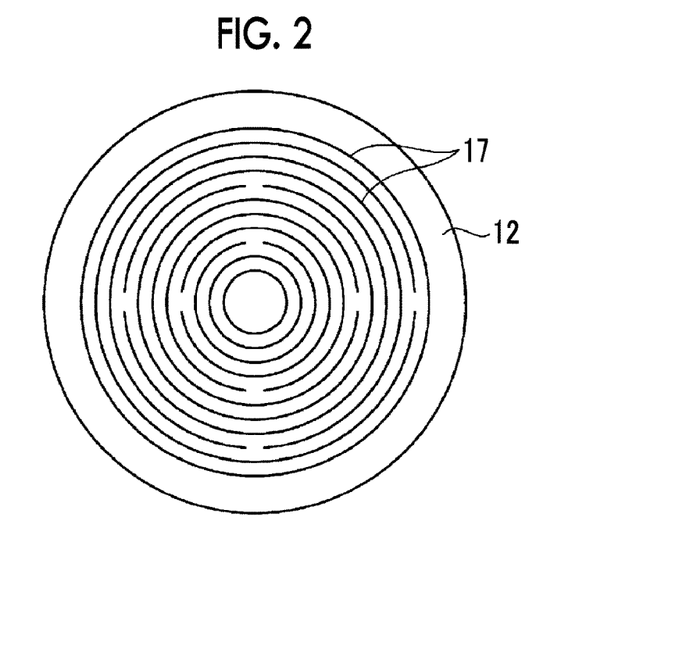
FIG. 2 is a plan view illustrating a removal layer of the repair patch.
Figure 3:
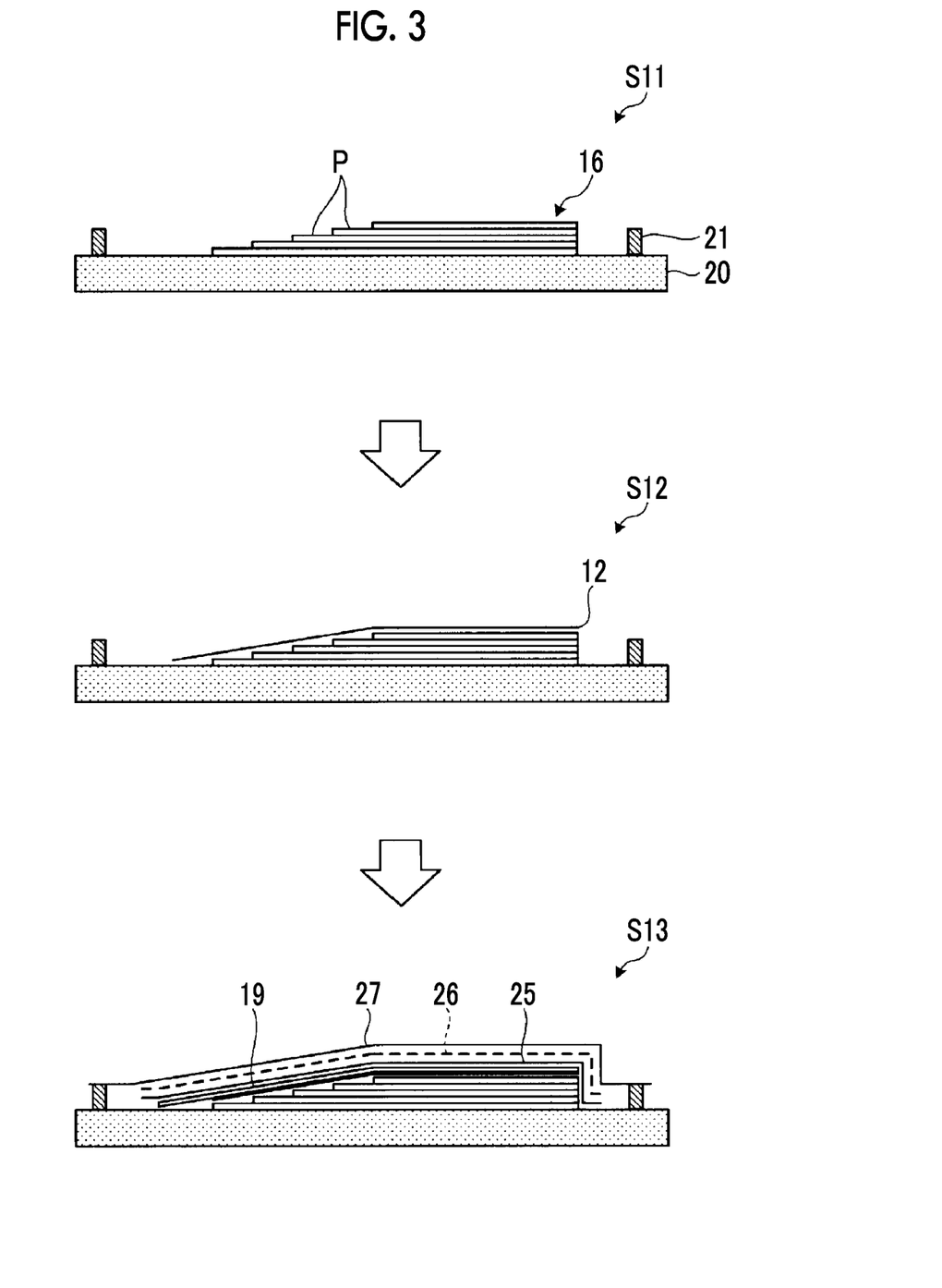
FIG. 3 is a view describing a method for molding a repair patch according to the first embodiment.
Figure 4:
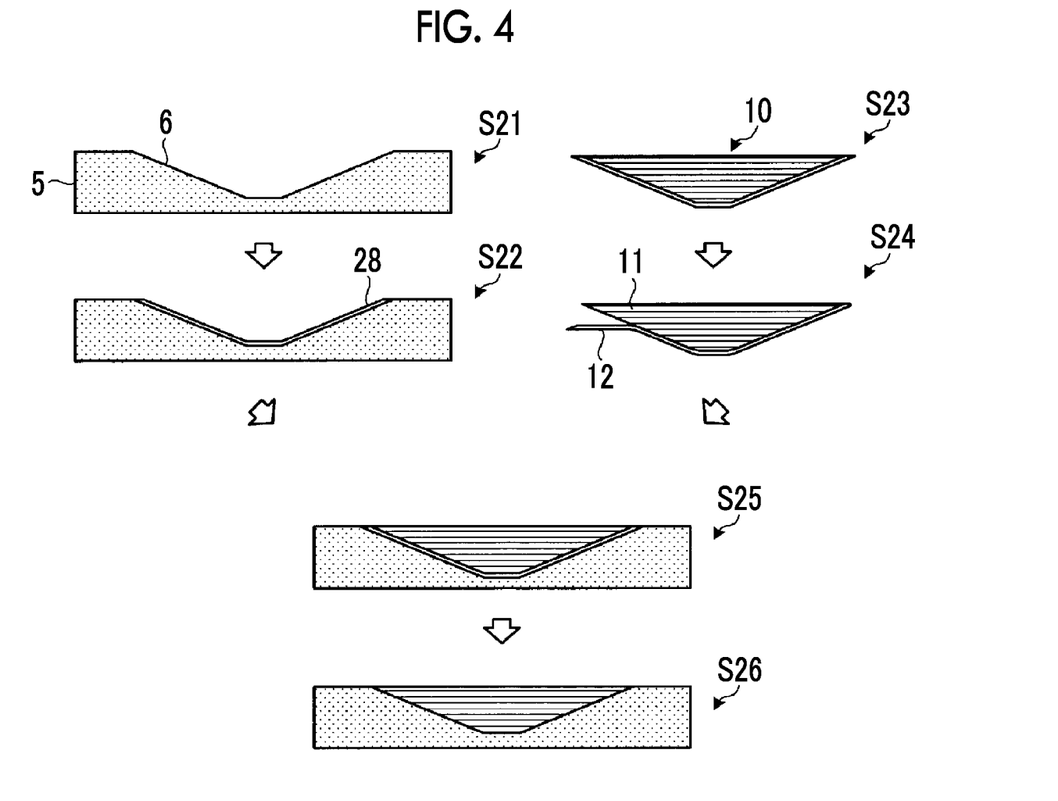
FIG. 4 is a view describing a method for repairing a composite material using the repair patch according to the first embodiment.
Figure 5:
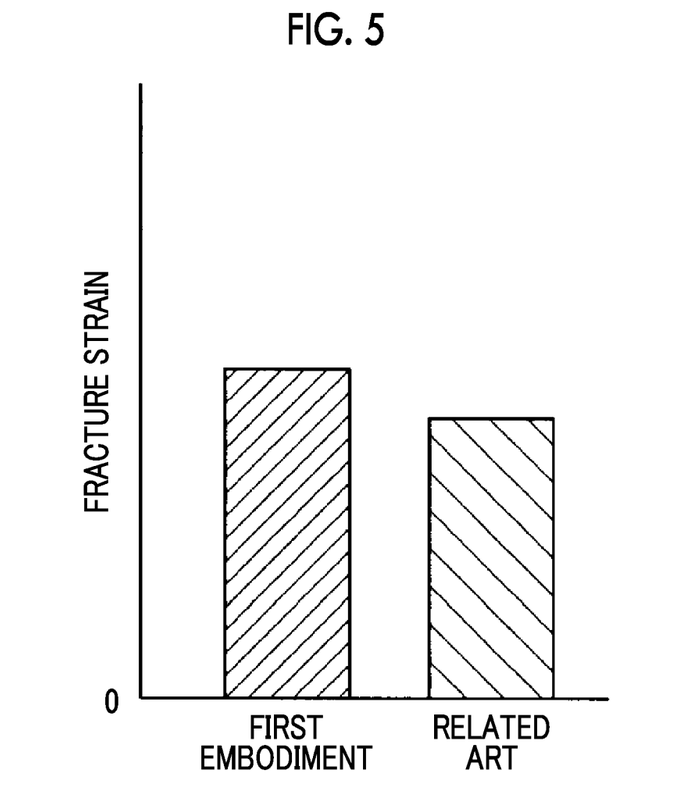
FIG. 5 is a graph relating to the repair result of a part to be repaired which is repaired with the repair patch according to the first embodiment.

FIG. 1 is a cross-sectional view schematically illustrating one example of the repair patch according to the first embodiment. FIG. 2 is a plan view illustrating a removal layer of the repair patch. FIG. 3 is a view describing a method for molding a repair patch according to the first embodiment. FIG. 4 is a view describing the method for repairing a composite material using the repair patch according to the first embodiment. FIG. 5 is a graph relating to the repair result of the part to be repaired which is repaired with the repair patch according to the first embodiment.

First, the repair patch 10 will be described with reference to FIG. 1. The repair patch 10 is made of a composite material, and includes a patch main body 11 and a removal layer 12.

The patch main body 11 has a truncated cone shape having a bottom surface 15, a top surface 14, and a side surface (inclined surface) 13. In the patch main body 11, the top surface 14 and the side surface 13 form a bonding surface 18 to be bonded to the part to be repaired, and the bottom surface 15 is a surface opposite to the bonding surface 18.

The patch main body 11 is produced by laminating and precuring a plurality of prepregs P as fiber reinforced preforms in a thickness direction. Incidentally, a direction along a plane orthogonal to the thickness direction is referred to as an in-plane direction. The prepreg is produced by infiltrating reinforcing fibers with a resin. For example, carbon fibers are used as the reinforcing fibers; however, the reinforcing fibers are not limited to the carbon fibers, and may be plastic fibers, glass fibers, natural fibers, or metallic fibers. A thermosetting resin is preferable as the resin; however, the resin may be a thermoplastic resin. The thermosetting resin is, for example, an epoxy resin. Examples of the thermoplastic resin are polyetheretherketone (PEEK), polyetherketoneketone (PEKK), and polyphenylenesulfide (PPS). Incidentally, the resin is not limited to the above-described resins, and other resins may be used. In addition, in addition to molding using the prepregs, methods such as hand layup, resin infusion, and RTM may be applied.

Specifically, the plurality of prepregs P which are cut in a circular shape are used to produce the patch main body 11, and the plurality of prepregs P are cut in a circular shape such that the diameters of the prepregs P are increased at a constant ratio. In a state where the central axes of the prepregs P are aligned, the prepregs P are concentrically laminated in order of size to form the patch main body 11 having a truncated cone shape. For this reason, intervals between outer end portions of the prepregs P which are adjacent to each other in the thickness direction are predetermined intervals that are concentric in a radial direction of the patch main body 11 having a circular shape.

The bonding surface 18 includes the top surface 14 and the side surface 13. In the bonding surface 18, the side surfaces 13 are located on both sides in the in-plane direction, the top surface 14 being interposed between both the sides, in a cross section that is illustrated in FIG. 1 and is cut in the thickness direction of the patch main body 11 along a central axis of the patch main body 11 having a truncated cone shape. Each of the side surfaces 13 is a surface that is straight inclined with respect to the thickness direction. Namely, in the cross section illustrated in FIG. 1, the side surfaces 13 on both the sides are inclined with respect to the thickness direction to spread out as the side surfaces 13 extend from the removal layer 12 toward the patch main body 11. The bottom surface 15 is a surface extending in the in-plane direction, and is a surface serving as the surface of a part 5 to be repaired after repair.

As illustrated in FIG. 2, the removal layer 12 is provided on a bonding surface 18 side of the patch main body 11 in the thickness direction, and is peelably joined to the patch main body 11. The removal layer 12 is formed of, for example, a peel ply. In addition, a processed portion is formed in the removal layer 12 to cause the removal layer 12 to have a shape complementary to that of the side surface 13 of the patch main body 11. Specifically, the processed portion is formed of a plurality of slits 17.

The plurality of slits 17 are formed at positions to face the outer end portions of the plurality of prepregs P in the thickness direction. For this reason, the slit 17 is formed in a circular shape, and the plurality of slits 17 are concentrically formed at predetermined intervals in the radial direction. In addition, the slit 17 is formed in a C shape where a part in a circumferential direction of the slit 17 is connected to not be separated when the removal layer 12 is peeled off.

Since the plurality of slits 17 are formed in the removal layer 12, as illustrated in FIG. 1, the removal layer 12 has a step shape which is complementary to those of the outer end portions of the prepregs P having a step shape in the side surface 13 of the patch main body 11.

Next, the method for molding the repair patch 10 in which the repair patch 10 of FIG. 1 is molded will be described with reference to FIG. 3. In the method for molding the repair patch 10, the repair patch 10 is molded using a molding tool 20. Incidentally, FIG. 3 illustrates a part of the repair patch 10.

Specifically, in the method for molding the repair patch 10, the plurality of prepregs P are laminated on the molding tool 20 in the thickness direction to form a laminate 16 (step S11: laminate forming step). In the laminate forming step S11, the prepreg P having a circular shape with a large diameter is laminated on the molding tool 20, and the prepregs P having a circular shape are laminated, the prepregs P being reduced in diameter as the prepregs P are disposed closer to an upper side. In addition, in the laminate forming step S11, vacuum suction is performed whenever a predetermined number of the prepregs P are laminated. Namely, when the prepregs P are laminated, there is a possibility that a gap between the layers of the prepregs P laminated is formed. Therefore, vacuum suction is periodically performed to remove the gap formed between the layers of the prepregs P. In the laminate 16 formed on the molding tool 20, the bonding surface 18 is an upper surface.

Subsequently, the removal layer 12 is disposed to cover the bonding surface 18 of the laminate 16 formed on the molding tool 20 (step S12: removal layer disposition step). In the removal layer disposition step S12, the removal layer 12 is disposed on the laminate 16 such that the slit 17 of the removal layer 12 faces the outer end portion of the prepreg P of the laminate 16.

Next, the laminate 16 and the removal layer 12 are heated to be integrated to mold the repair patch 10 (step S13: molding step). In the molding step S13, first, a film adhesive 19 is disposed to cover the removal layer 12. The film adhesive 19 is a covering member that follows deformation of the removal layer 12 during molding, and allows the removal layer 12 to be deformed. The film adhesive 19 is, for example, a thermosetting resin that melts when heated, and at least a part of the film adhesive 19 is infiltrated into the prepregs P to be heat cured. Subsequently, in the molding step S13, a shield film 25 made of fluororesin such as FEP is disposed to cover the film adhesive 19. The shield film 25 suppresses the resin, which melts during molding, from flowing into a breather 26 to be described later.

In addition, in the molding step S13, the breather 26 is disposed to cover the shield film 25. The breather 26 forms an air flow path during vacuum suction. Then, in the molding step S13, a bag film 27 is disposed to cover the breather 26, and a sealing member 21 seals a space between the molding tool 20 and the bag film 27, so that a sealed space is formed inside the bag film 27.

In the molding step S13, the sealed space which is formed inside the bag film 27 is vacuum suctioned via a vacuum suction port (unillustrated) to bring the inside of the bag film 27 into a vacuum state. Then, in the molding step S13, in the vacuum state, the laminate 16, the removal layer 12, and the film adhesive 19 are heated to mold the repair patch 10 that is precured.

In the molding step S13, since the slits 17 are formed in the removal layer 12, when the inside of the bag film 27 is vacuum suctioned, portions of the removal layer 12 between the slits 17 press the outer end portions of the prepregs P of the laminate 16 in the thickness direction, and in this state, the laminate 16 and the removal layer 12 are heat cured. For this reason, in the molding step S13, the removal layer 12 is deformed according to the side surface 13 of the laminate 16 having a step shape due to the slits 17.

Next, the method for using the repair patch 10 to repair a composite material having a part to be repaired will be described with reference to FIG. 4.

In the method for repairing a composite material, the repair patch 10 and a resin sheet 28 as an adhesive agent are used. The resin sheet 28 is produced by forming a resin in a sheet shape, and is made of a material that can be bonded to the resin used as the material of the repair patch 10. Incidentally, the resin sheet 28 may be made of the same resin as or a different resin from that used as the material of the repair patch 10, and the resin material is not particularly limited. In addition, a plurality of types of the repair patches 10 having different diameters are prepared, and the repair patch 10 is appropriately selected and used according to the shape (size) of a counterbore hole 6 to be formed which will be described later.

First, a defect part formed in a composite material is processed by cutting or the like to form the counterbore hole 6 having a shape illustrated in FIG. 4 (step S21). An opening portion of the counterbore hole 6 is formed in a circular shape, and a bottom surface of the counterbore hole 6 is formed in a circular shape that is smaller than the opening portion. In addition, a side surface of the counterbore hole 6 is a surface that is inclined to spread as the surface extends from the bottom surface toward the opening portion. The bottom surface and the side surface of the counterbore hole 6 form a surface to be bonded to which the repair patch 10 is to be bonded.

Subsequently, the resin sheet 28 is disposed on an inner surface including the bottom surface and the side surface of the counterbore hole 6 that is formed as a recess (step S22: adhesive agent disposition step). Specifically, in the adhesive agent disposition step S22, the resin sheet is disposed in contact with the inner surface of the counterbore hole 6 to cover the inner surface.

The repair patch 10 is prepared almost at the same time as steps S21 and S22 (step S23). Then, the removal layer 12 is peeled off from the patch main body 11 of the repair patch 10 (step S24: peeling step).

Next, the repair patch 10 is disposed on the resin sheet 28 such that the bonding surface 18 of the patch main body 11 faces the inner surface which is the surface to be bonded of the counterbore hole 6 (step S25: patch disposition step). Incidentally, in the patch disposition step S25, a marking is applied to the bottom surface (surface) of the patch main body 11, a marking is applied to a surface of the composite material, the surface being the part 5 to be repaired, and the patch main body 11 may be disposed in the counterbore hole 6 such that the position of the patch main body 11 is an appropriate position with respect to the counterbore hole 6.

Thereafter, the resins of the patch main body 11 and the resin sheet 28 are melted to bond the patch main body to the counterbore hole 6 (step S26: bonding step). Incidentally, in the bonding step S26, although unillustrated, the patch main body 11 and the resin sheet 28 are sealed with the bag film or the like, and the patch main body 11 and the resin sheet 28 are heated while the sealed space is vacuumed, so that the repair patch 10 and the resin sheet 28 are completely cured. Then, finishing is performed on the surface of the composite material, the surface being the part to be repaired, and the bottom surface 15 of the patch main body 11 (step S26) to repair the part 5 to be repaired.

Next, the repair result of the part 5 to be repaired which is repaired with the repair patch 10 will be described with reference to FIG. 5. In FIG. 5, the vertical axis is the fracture strain. Incidentally, in a repair patch of the related art which is used to repair a part to be repaired, fiber meandering is generated in outer end portions of the prepregs P. When the fracture strains of the related art and the first embodiment were compared, it was confirmed that the fracture strain of the first embodiment was larger than the fracture strain of the related art. Namely, it was confirmed that the recovery of the strength in the first embodiment was larger than that of the related art since the part 5 to be repaired was repaired with the repair patch 10 of the first embodiment.

As described above, according to the first embodiment, since the outer end portions of the plurality of prepregs P, the outer end portions forming the side surface 13 of the patch main body 11, can be pressed by the removal layer 12 having a shape complementary to that of the side surface 13, fiber meandering can be suppressed from being generated in the outer end portions of the prepregs P. For this reason, the patch main body 11 can be shaped into an appropriate shape. In addition, the removal layer 12 can protect the bonding surface 18 of the patch main body 11.

In addition, according to the first embodiment, since the slits 17 are formed in the removal layer 12, the outer end portions of the prepregs P can be appropriately pressed by the removal layer 12.

In addition, according to the first embodiment, since the removal layer 12 which is a peel ply can be peeled off to activate the bonding surface 18 of the patch main body 11, the bondability of the part 5 to be repaired to the counterbore hole 6 can be enhanced.

In addition, according to the first embodiment, since the removal layer 12 is covered with the film adhesive 19, the removal layer 12 can be appropriately deformed without interruption to the deformation of the removal layer 12. Incidentally, in the first embodiment, the film adhesive 19 is applied; however, as long as the bag film 27 has good followability, the film adhesive 19 may be omitted. Namely, the bag film 27 may be applied as a covering member that follows deformation of the removal layer 12.

In addition, according to the first embodiment, the removal layer 12 is peeled off from the patch main body 11 to cause the bonding surface 18 of the patch main body 11 to be exposed, the bonding surface 18 being protected, so that the patch main body 11 can be bonded to the counterbore hole 6 of the part 5 to be repaired. For this reason, while foreign matter is suppressed from adhering to the bonding surface 18 of the patch main body 11, the patch main body having an appropriate shape can be bonded to the counterbore hole 6, so that the part 5 to be repaired can be appropriately repaired.

Incidentally, in the first embodiment, the patch main body 11 has a truncated cone shape; however, the patch main body 11 is not particularly limited to having the shape, and may have any shape as long as having the side surface 13 which is inclined.

Second Embodiment

Figure 6:
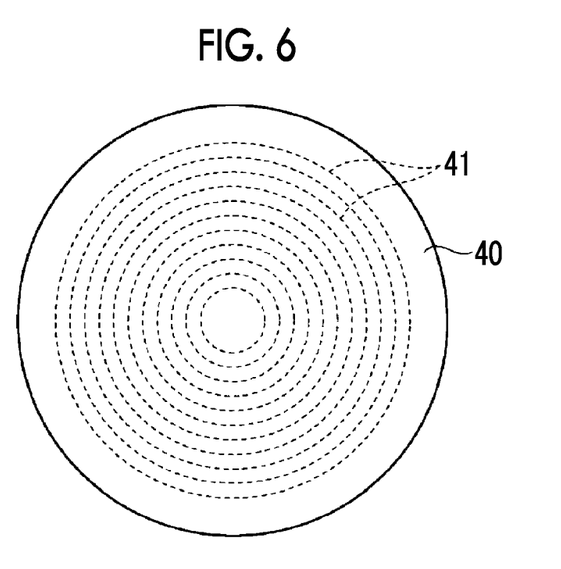
FIG. 6 is a plan view illustrating a removal layer of a repair patch according to a second embodiment.

Next, a removal layer 40 of a repair patch according to a second embodiment will be described with reference to FIG. 6. FIG. 6 is a plan view illustrating the removal layer of the repair patch according to the second embodiment. In the second embodiment, in order to avoid duplicated description, portions different from the first embodiment will be described, and while portions have the same configurations as those of the first embodiment are denoted with the same reference signs, description will be given.

In the removal layer 40 of the repair patch 10 in the second embodiment, a plurality of through-holes 41 are formed instead of the slits 17 of the first embodiment. The plurality of through-holes 41 are formed at positions to face the outer end portions of the plurality of prepregs P in the thickness direction. Namely, the plurality of through-holes 41 are formed side by side along the circumferential direction to form a circular shape, and are concentrically formed at predetermined intervals in the radial direction.

As described above, according to the second embodiment, since the plurality of through-holes 41 are formed in the removal layer 40, the outer end portions of the prepregs P can be appropriately pressed by the removal layer 12.

REFERENCE SIGNS LIST

5: Part to be repaired
6: Counterbore hole
10: Repair patch
11: Patch main body
12: Removal layer
13: Side surface
14: Top surface
15: Bottom surface
16: Laminate
17: Slit
18: Bonding surface
19: Film adhesive
20: Molding tool
21: Sealing member
25: Shield film
26: Breather
27: Bag film
28: Resin sheet
40: Removal layer
41: Through-hole
P: Prepreg

The invention claimed is:

1. A repair patch for repairing a composite part comprising:
a patch main body that is formed by laminating a plurality of fiber reinforced preforms in a thickness direction, and has a bonding surface to be bonded to the composite part; and a removal layer that is provided on the bonding surface and peelable from the patch main body, wherein the bonding surface includes an inclined surface that is inclined with respect to the thickness direction of the patch main body, the removal layer includes a processed portion that causes the removal layer to have a shape complementary to a shape of the inclined surface of the patch main body, and the processed portion is formed of slits that are formed at positions to face end portions of the plurality of fiber reinforced preforms in the thickness direction of the patch main body, the end portions being located in the inclined surface.

2. The repair patch according to claim 1, wherein the removal layer is a peel ply.

3. A method for repairing a composite a part, the method comprising:

preparing the repair patch according to claim 1 in advance;

peeling the removal layer from the patch main body;

disposing an adhesive agent on a surface to be bonded of the composite part;

disposing the bonding surface of the patch main body to face the surface to be bonded with the adhesive agent interposed therebetween; and bonding the patch main body to the composite part.

4. A method for forming the repair patch according to claim 1, the method comprising:

laminating the plurality of fiber reinforced preforms in a thickness direction such that the bonding surface to be bonded to the composite part to be repaired is an upper surface, to form the patch main body;

disposing the removal layer, which is peelable from the laminate, to cover the bonding surface of the patch main body; and heating the patch main body and the removal layer to mold the patch main body and the removal layer, wherein during heating, the removal layer is deformed according to the shape of the inclined surface of the patch main body due to the processed portion.

5. The method according to claim 4, wherein in heating the patch main body and the removal layer, a covering member which follows the deformation of the removal layer is disposed to cover the removal layer to mold the patch main body and the removal layer.

6. A repair patch for a composite part comprising:

a patch main body that is formed by laminating a plurality of fiber reinforced preforms in a thickness direction, and has a bonding surface to be bonded to the composite part; and a removal layer that is provided on the bonding surface peelable from the patch main body, wherein the bonding surface includes an inclined surface that is inclined with respect to the thickness direction of the patch main body, the removal layer includes a processed portion that causes the removal layer to have a shape complementary to a shape of the inclined surface of the patch main body, wherein the processed portion is formed of a plurality of through-holes that penetrate through the removal layer at positions to face end portions of the plurality of fiber reinforced preforms in the thickness direction of the patch main body, the end portions being located in the inclined surface.

7. The repair patch according to claim 6, wherein the removal layer is a peel ply.

8. A method for repairing a composite part, the method comprising:

preparing the repair patch according to claim 3 in advance;

peeling the removal layer from the patch main body;

disposing an adhesive agent on a surface to be bonded of the composite part;

disposing the bonding surface of the patch main body to face the surface to be bonded with the adhesive agent interposed therebetween; and bonding the patch main body to the composite part.

* * * * *